Oct. 23, 1928.
F. LÖSEL
1,688,933
MULTISTAGE DISK WHEEL TURBINE
Filed Aug. 16, 1924
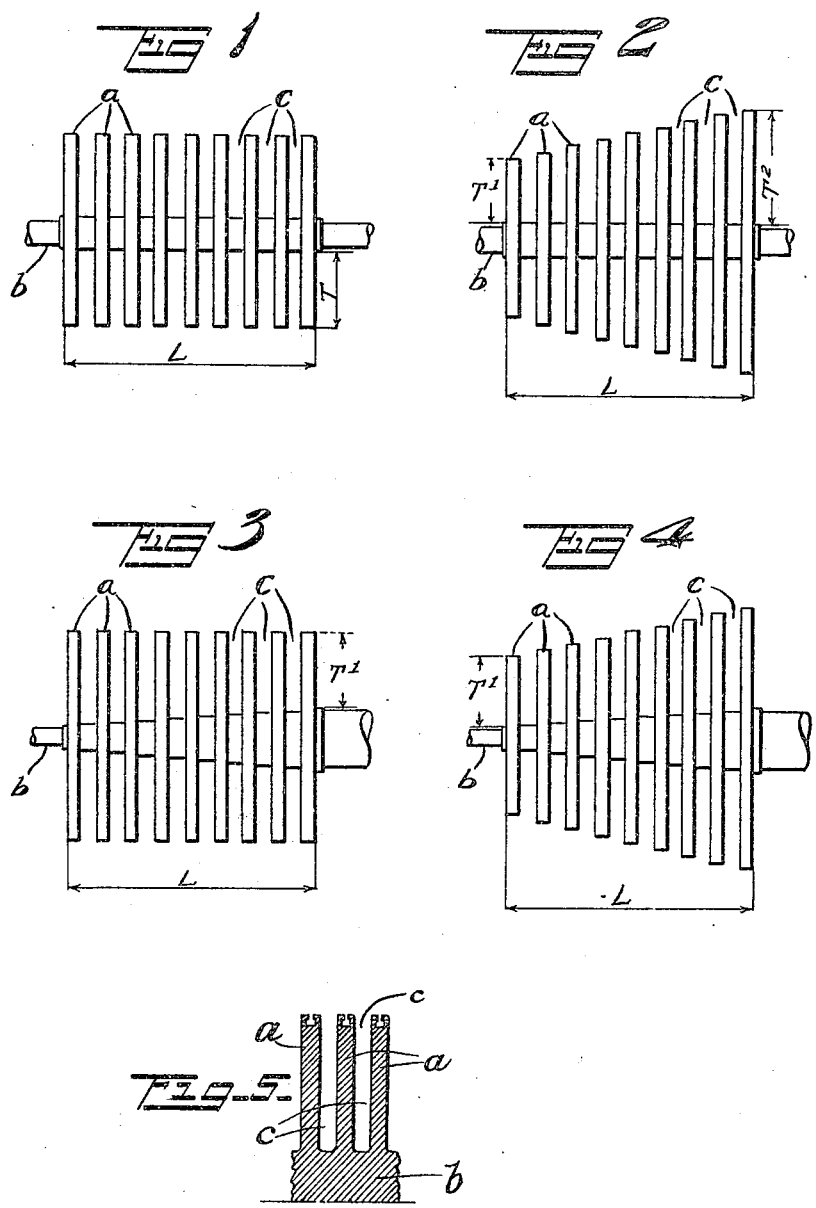
INVENTOR
Franz Lösel
BY Richard Eyre
ATTORNEY Patented Oct. 23, 1928.

1,688,933

UNITED STATES PATENT OFFICE.

FRANZ LÖSEL, OF BRUNN, CZECHOSLOVAKIA.

MULTISTAGE DISK-WHEEL TURBINE.

Application filed August 16, 1924, Serial No. 732,413, and in Austria February 7, 1924.

This invention relates to multi-stage disk wheel turbines and particularly rotors therefor.

The object of the invention generally is a turbine of this character having a rotor with its wheels and its shaft formed from an integral piece of material and of such construction as to reduce certain losses inherent in prior turbine constructions whereby the efficiency of the turbine is improved and better performance obtained. A further object is a rotor which is of more simple construction and has a higher degree of security and factor of safety during working conditions than has heretofore been possible.

In prior turbine constructions having large wheel diameters and very few stages, there is considerable hydraulic loss in the turbine operation due to the high steam velocities and the undue diversion of the working fluid-flow within the turbine, and in prior turbines in which the rotor disks are made separate from the shaft the construction is more or less complicated and their dimensions and shape must be correlated with the design of the shaft to withstand the stresses and strains set up during operation of the turbine, resulting in large shaft diameters and large clearance spaces with undue clearance losses between the stages. The hydraulic losses may be substantially reduced and the turbine efficiency increased by operating the turbine within the small steam velocity zone characteristic of my turbines and defined in my Patent No. 1,494,850, of May 20, 1924, and in turbines of this character it is advantageous to assemble as many turbine stages upon one shaft as is practically possible. But with the ordinary and prior constructions the assembly of a multiplicity of turbine disks or stages upon one rotor shaft often results in a rotor shaft of undue length or size or both, resulting in increased gland losses, unfavorable critical speeds, etc. My present invention, however, renders it possible to incorporate upon a shaft of given length the very maximum of rotor disks or with a given number of rotor disks to reduce the shaft to the shortest length possible, with substantial reduction of the clearance, diversion and other losses inherent in prior constructions, and moreover with avoidance of the difficulties and complications incident to the fastening and securing of separate wheels to the shaft. I effect this by making the disk wheels and the rotor shaft from a single, integral piece, and by milling or machining out rectangular ring grooves from a cylindrical metallic body to form a multiplicity of disks with parallel planar sides at right angles to the shaft. The building of such a rotor is facilitated by the small diameters of disks required for the low steam velocity characteristic of my efficient turbine constructions.

For a better understanding of my invention, reference may be had to the accompanying drawings forming a part of this application wherein:

Fig. 1 of the drawing is a side view of a turbine rotor embodying my invention,

Fig. 2 is a side view of a modified construction of rotor embodying my invention, Fig. 3 is a side view of another modification, Fig. 4 is a side view of still another modification, and Fig. 5 is a sectional view through a portion of the turbine.

Referring to Fig. 1 I have indicated a turbine rotor embodying my invention having a shaft $b$ and rotor disks $a$ formed integrally therewith. The rotor is formed by milling out of a cylindrical block the rectangular ring grooves $c$ forming the disks wheels $a$ whose radial surfaces are in planes at right angles to the shaft $b$. In this particular embodiment the grooves $c$ and the disks $a$ have the same depth throughout, namely depth T. By means of this construction a practical maximum number of turbine wheels or disks $a$ are incorporated with their integral shaft $b$ into a single casing. Preferably the length L of the rotor, that is, the distance between the exterior walls of the first and last wheels $a$ of the rotor, shall be at least twice as large as the depth T of the wheels or ring grooves. By experiment I have determined that this distance should exist for best turbine performance with practical considerations taken into account. The diversion angle is zero in this modification, the wheels being of the same diameter, and the diversion losses are negligible. Moreover the clearance spaces are reduced to a minimum throughout the rotor depth consistent with safety in operation.

In the modification illustrated in Fig. 2 the diameter of the disks or wheels $a$ increases by degrees while the diameter of the shaft $b$ remains the same throughout, the depth of the wheel grooves increasing from $T_1$ to $T_2$ from one end of the rotor to the other. In the modification illustrated in Fig. 3 the wheels or disks $a$ are of the same diameter throughout and the diameter of the shaft $b$ increases gradually from one end of the rotor to the other so that in both modifications of Figs. 2 and 3 the ring grooves $c$ have unequal depths from one end to the other. In these cases the length $L$ of the rotor should be chosen with reference to the smallest groove depth $T_1$ so that it is at least equal to or greater than double the smallest groove depth $T_1$.

In Fig. 4 I have shown both the diameters of the rotor disk $a$ and the shaft $b$ increasing gradually from the high pressure end to the other and in this case, as with the modifications of Figs. 3 and 4 the length $L$ of the rotor should be for best performance at least twice as large as the smallest groove depth $T_1$. The diversion angle of the modification in Fig. 3 is zero, as in the modification of Fig. 1, while in Figs. 2 and 4 this angle is very small resulting in small losses due to diversion. In all modifications the clearances are reduced to a practical minimum with consequent reduction of clearance losses.

The rotor, according to my invention, has the advantage that it is capable of more safely resisting the stresses set up by heat expansions or extensions in consequence of the parallel walls of its disks and its construction is simple and can be economically produced. Moreover the working steam flow through the turbine determined by the proportion $L$ is equal to or greater than $2 \times T$ is so long that the steam has considerable time to work and change its heat energy into mechanical energy thereby avoiding diversion or reducing the diversion of the steam flow to the smallest possible degree; and further, the small circumference velocities result in good hydraulic efficiency whereby the economy of the turbine plant is substantially increased.

Having thus described my invention, what I claim and desire to protect by Letters Patent is:

A multi-stage disk-wheel turbine of the low velocity type comprising a multiple disk-wheel rotor, the rotor shaft and the disk-wheels being integrally formed into a single solid unit with the disks disposed at right angles to the shaft and each integral disk-wheel being of substantially uniform thickness from the shaft radially outward to its outermost peripheral edge, whereby unequal temperature expansions and contractions in the rotor unit and dangerous stresses due thereto are avoided notwithstanding the high temperature operation and whereby the turbine length may be kept within practical limits notwithstanding the large number of stages operating at low steam velocity necessary to obtain the required efficiency.

In testimony whereof, I have signed my name to this specification.

FRANZ LÖSEL.